Sept. 28, 1965    V. E. HAMILTON    3,209,191
CATHODE RAY TUBE SCREEN AND AMBIENT LIGHT FILTER
Filed Aug. 11, 1964    3 Sheets-Sheet 1
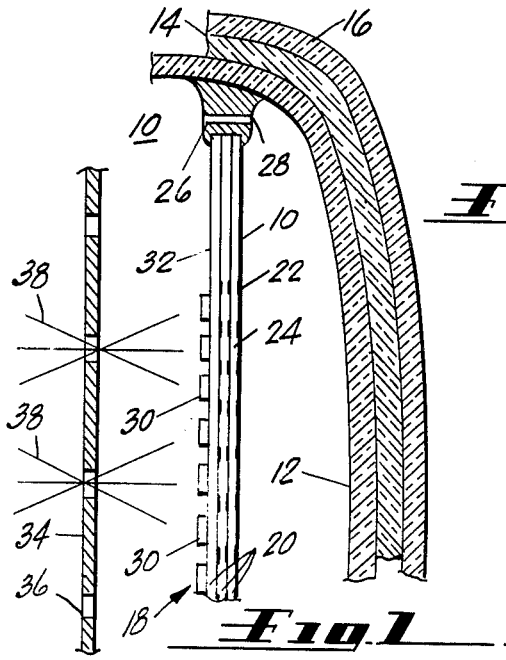
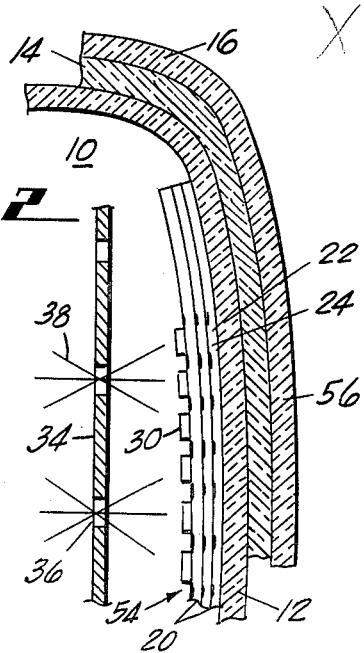
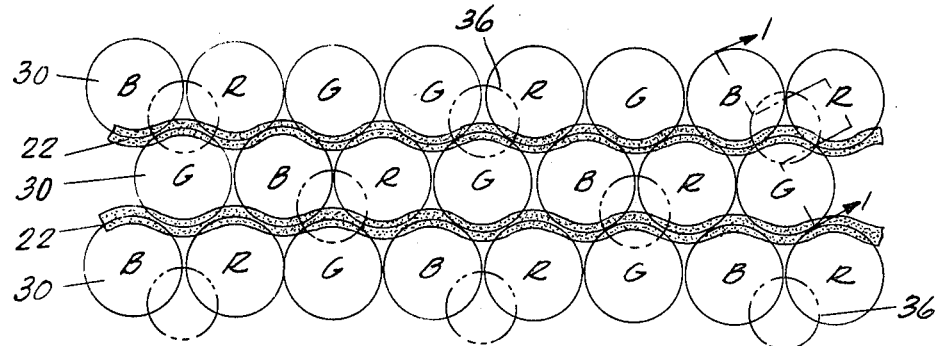
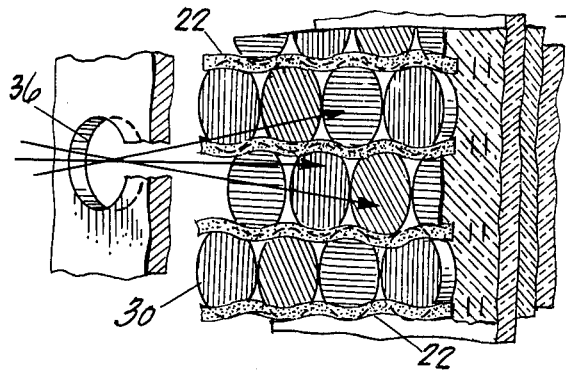
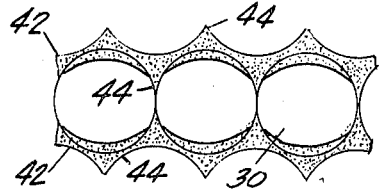
INVENTOR.
VERN E. HAMILTON
BY
ATTORNEY Sept. 28, 1965     V. E. HAMILTON     3,209,191
CATHODE RAY TUBE SCREEN AND AMBIENT LIGHT FILTER
Filed Aug. 11, 1964     3 Sheets-Sheet 2

INVENTOR.
VERN E. HAMILTON
BY Edwin Coates
- ATTORNEY -

Sept. 28, 1965  V. E. HAMILTON  3,209,191
CATHODE RAY TUBE SCREEN AND AMBIENT LIGHT FILTER
Filed Aug. 11, 1964  3 Sheets-Sheet 3

INVENTOR.
VERN E. HAMILTON
BY Edwin Coates
ATTORNEY

United States Patent Office 3,209,191
Patented Sept. 28, 1965

3,209,191
CATHODE RAY TUBE SCREEN AND
AMBIENT LIGHT FILTER
Vern E. Hamilton, Palos Verdes Estates, Calif., assignor to Douglas Aircraft Company, Inc., Santa Monica, Calif.
Filed Aug. 11, 1964, Ser. No. 388,895
24 Claims. (Cl. 313—110)

This invention relates to a light ray filter for use with cathode ray tubes to improve the image presented thereby, and has particular utility when applied to color television tubes. The filter traps ambient light rays angularly directed toward the phosphor screen of a cathode ray tube and traps both diffuse and concentrated light traveling in undesired directions from the screen. This application is a continuation in part of my application, Serial No. 206,229, filed June 29, 1962.

Cathode ray tubes are particularly susceptible to the effects of being struck by ambient light rays. As is generally known, a cathode ray tube has a glass front wall, the inner surface of which is coated with phosphors which are caused to glow momentarily when struck from the rear by electrons from one or more electron guns in a selective manner to produce an image of some sort. When ambient light rays strike the front surface of the glass they are refracted inwardly and strike a multiplicity of phosphors. The light energy is reflected diffusely from these phosphors whether or not they are also being activated by the electron gun. The result is that many of the shadow areas, or low lights, are illuminated and confused with the highlights, thus degrading the contrast. These low lights may be made as bright as the highlights in some cases and the picture may be completely lost.

Various schemes have been devised to prevent ambient light rays from striking the cathode tube glass or phosphors, either of which may be considered as the "screen". Large hoods have been placed around the tubes extending toward the viewers but these are very clumsy. Honeycomb cores have been placed in front of the tube but the honeycomb walls reflect the light rays onward and they strike the screen anyway. My co-pending application for patent on Ambient Light Filter, Serial No. 230,644, filed October 15, 1962, which is a continuation in part of my now abandoned Application Serial No. 138,855, filed September 18, 1961, discloses a novel construction which solves the problem.

Briefly, that novel construction comprises a filter body of transparent material in which are embedded a plurality of filter elements having a grid pattern. Each element constitutes a tier of alternating transparent and light absorbing areas in closely spaced relation to constitute a multiplicity of light transmitting apertures bordered by light absorbing material. The grid pattern may be formed of generally parallel straight or wavy lines, or lines crossing each other to produce cells of varying shapes including but not limited to squares, rectangles, and diamonds. The tiers are in generally parallel relation to each other and are spaced depthwise of the filter body, forming a light trapping lattice with the light transmitting apertures in registry to constitute depthwise directed viewing cells. The axes of the cells may be normal to the plane of the filter body or at some other preselected angle, and may be parallel or divergent within limits.

Ambient light rays striking the surface of the filter body at acute angles other than normal are refracted into the cells at an angle, striking one or another of the depthwise spaced lines of opaque or light absorbing material and are absorbed thereby. The success of such filter results from the fact that the cells are very small in at least one lateral dimension and the lines forming the cell boundaries are extremely thin in the depthwise direction so that their edges present no appreciable grazing surface to reflect light rays onwardly. In fact, in a typical example the width of the apertures may be from .015 to .020 inch and the line width from .002 to .004 inch. The line thickness may vary from .0001 to .001 inch and the depthwise spacing between lines may be of the order of .010 inch. Such a filter with six filter elements is only one sixteenth inch thick.

Another problem encountered with cathode ray tubes is a glow surrounding the various bright portions of the signal image and commonly called a halo. This glow is caused by rays emanating from the phosphors and reflected by the internal front surface of the tube wall back into other phosphors, causing them to glow and produce spurious images. One proposal for eliminating these images is to make the glass wall substantially thicker so that those rays which are totally or almost totally reflected will travel a considerable distance, largely laterally, so that many of them will strike the side walls rather than the phosphor layer, and those which do still strike the layer will produce much less glow. A serious objection to this solution is that the front wall must be extremely thick, the thickness ranging up to one half of the tube diameter.

The present invention solves this problem by interposing the light trapping lattice between the phosphor layer and the first internal reflecting surface of the assembly. It can be applied exteriorly to a conventional television tube by securing the filter body directly to the front face of the tube, preferably with a clear transparent cement having substantially the same index of refraction as the tube wall and the filter body. This practically eliminates the front face of the tube and the rear face of the filter body as internal reflecting surfaces. Consequently the first internal reflecting surface is at the front face of the filter body, and the lattice traps the unwanted off-axis rays before they reach it. Hence there is no back reflection to produce a glow or spurious image. All of the forms of the invention disclosed are capable of accomplishing this result.

One of the unexpected and surprising advantages of this combination is that it is now possible to greatly increase the brightness of the image without degrading the image contrasts, with very simple modifications of the basic set. In the prior art devices which did not have the benefit of the space lattice type ambient light trapping filter the brightness that could be used was severely limited by the presence of the halo problem. While a set could be readily built and operated to produce a high intensity, the halo effect brought the low lights up to a value which degraded the image contrast. The use of gray glass in the forward tube wall to reduce the effect of ambient light rays traveling toward the screen also resulted in a slight reduction of halo intensity because the reflected portion of the image rays had to travel through the same glass. Thus, the contrast was improved. Unfortunately, however, the intensity of the rays traveling to the viewer was also reduced and brightness was lost. To bring the brightness up again would merely result in the need for a darker glass with no net improvement. A compromise was finally reached in which the darkness of the glass was chosen for the desired effect on the ambient light rays and the maximum brightness was limited to about 35 to 40 foot lamberts.

The integral filter-tube wall combination of the present invention is not subject to the limitations mentioned above. The filter element grid lines absorb all of the off-axis rays, meaning those rays which are at such angles that they do not travel through the viewing cells to become part of the signal within the viewing angle, and therefore such rays are not reflected back onto the phosphor screen to produce halo and reduce contrast. There is some reflection of those rays which do travel to the forward wall but it is relatively low in intensity and forms only a small proportion of the normal total. Even this small amount is largely eliminated by another feature of the invention, to be described later.

The grid pattern forms a very dark, practically black body, background so that the image at any intensity appears to be much brighter and the improvement in contrast is very noticeable. Since the filter traps the off-axis rays directed toward the screen it eliminates the need for the gray glass. Therefore clear glass can be used and the brightness of the image as viewed is substantially increased even at the same intensity of illumination of the phosphors. As a matter of fact, my integral filter-tube wall combination, which is clear, eliminates the need for a separate safety glass implosion shield. In addition, since the halo problem is practically eliminated, the actual intensity of illumination can be substantially increased.

With practically no modification the brightness of present sets can be increased to 45 to 50 foot lamberts, a clear gain of 25 percent or more. With suitable design changes there is nothing to prevent increases of as much as 100 percent, since the grid lines of the filter will absorb the off-axis rays of any brightness up to the maximum reasonable capability of the set. The practical limit is the point at which the "side glow" of the activated phosphors lights up adjacent phosphors and degrades the image contrast. Even then, the image is visible though not as good as desired. Thus it will be seen that with the present invention it is possible to obtain greatly increased contrast and even more brightness than needed in ordinary viewing conditions. In addition, for viewing in harsh sunlight where the conventional set is completely blanked out, the combination of the present invention produces a thoroughly viewable picture merely at the sacrifice of some sharpness.

As mentioned above, the primary problem is that of ambient light rays from the exterior striking and lighting up various portions of the phosphor layer and degrading the image contrast. While my previous invention eliminated this difficulty in general when used as disclosed, there still remains a special problem in connection with color television. As is well known, the inner face of the forward wall of a conventional cathode ray tube, including "black and white" television is provided with a uniform coating of phosphors which emit a "white" light when activated. No matter what grid pattern is used and no matter what percentage of the total signal image is blocked by the light absorbing areas of the filter elements, the light which reaches the viewer is all "white" and the image presented is a true image.

On the other hand, in the present day color television tube three types of phosphors are used to produce blue, green, and red effects or "colors." Variations in intensity and area of activation produce apparently intermediate colors in the eye of the viewer. The coating is produced by printing individual dots of phosphors on the inner face of the tube wall. The dots are arranged in horizontal lines with the "colors" repeated in sequence and the dots in succeeding lines are set over a half space. The net result is a multiplicity of adjoining triangle groups of blue, green, and red arranged in a geometrical pattern. With the filter body spaced a substantial distance from the phosphor screen the areas blocked by the grid pattern vary with the view point and can change the color composition of the whole picture. The horizontal diamond pattern can conceivably greatly reduce the visibility of one of the colors while leaving the other two unaffected, which would seriously modify the color composition.

It is apparent then that the ambient light rays must be trapped without adversely affecting the color composition and with a minimum reduction in total signal image transmission. This is accomplished by forming a filter as disclosed in my previous application including a filter body of transparent material and a plurality of filter elements of grid form, and depositing the color phosphor layer on the rear face of the filter body. The grid pattern preferably comprises a multiplicity of generally straight and generally parallel lines of light absorbing material having the same pitch as the rows of dots. The lines are so registered with the dots as to follow a path overlying the bottoms of the dots in one row and the tops of the dots in the next lower row. A generally straight line is to be understood as including any line which follows the general course of a straight line even though it deviates laterally to some extent or has excrescences or protuberances along its margins. It will be seen that such an arrangement will trap ambient light rays approaching from above or below the axis of the tube, while providing the maximum image signal transmission and a wide range of vision horizontally for viewing purposes. In addition, since it blocks the same amount of transmission from each dot it has no adverse effect on the color composition. There is no parallax problem because the filter grids are immediately adjacent to the phosphor dots.

In the limited case of a single viewer, as in military or laboratory use, each grid pattern may take the form of a closed figure, such as a circle or hexagon, for each dot. This gives the maximum protection against ambient rays from any direction while still providing a sufficient angle of vision for the viewer to move slightly.

The filter with its attached phosphor dot layer may be made separately and mounted in the cathode ray tube at a point spaced rearwardly from the front wall of the tube. However, in its preferred form, which eliminates extra reflecting and refracting surfaces, the filter is made to conform to the inner face of the tube wall and so secured thereto as to constitute a substantially integral body of transparent material from the phosphor layer to the outer surface of the tube wall.

An additional problem which is very minor with prior art sets but which assumes considerable importance in my invention combination is the specular reflection off the first surface of the various light sources.

In the conventional set, largely because of the halo effect described above, the entire background of the screen has a rather high level of illumination. When this is combined with the brightness of the image itself the total or overall brightness has the effect of reducing the sensitivity of the eye to relatively low intensity images. Since those specular reflections which strike the eye of a viewer result from rays of light which strike the first surface at angles not far from normal angles the percentage of reflection is low, about 5 percent or a little more. With the reduced visual sensitivity these reflections are not noticeable enough to be irritating. Reflections at the larger angles which have considerable intensity pass to the side and are of no consequence.

When my filter is combined with the usual cathode ray tube as described above, the halo illumination is reduced to a very low level. In addition the grid pattern of the filter produces a background which is almost a black body and practically the only illumination reaching the eye of the viewer is from the image itself. Thus the "view" moves to the black end of the gray scale and the eye becomes greatly more sensitive to low light levels, with the result that specular reflections which would be considered of very low intensity on a conventional set now appear to be quite bright and so noticeable as to be irritating.

This problem is overcome by providing an anti-reflection interference coating on the front face of the filter or the tube wall, whichever is outermost. A single layer coating may reduce the reflectance at normal or near normal angles to 2 or 3 percent at least in a narrow band of wave lengths. A proper combination of three or four layers can reduce the reflectance to less than one percent over a rather large proportion of the visible spectrum. Therefore the intensity of the reflections within the desired viewing angle can be reduced by 75 to 80 percent. At those angles where the coating is less effective the reflections fall outside the normal viewing angle determnied by the filter and are of no consequence. Thus the control by the filter of the predetermined viewing angle cooperates to keep viewers within limits where the specular reflection is not annoying.

The interference coating cooperates with the filter in still another way to improve the contrast. As stated above, the grid lines of the space lattice trap and absorb the off-axis rays in the integral filter-tube wall combination. Those rays which are close to normal are, of course, the ones which pass through the viewing cells and the front wall of the transparent body. These are only a small proportion of all the rays which are emitted conically by each radiant spot of phosphor but their reflections are a factor to be considered. Within the rather limited angle of incidence permitted by any particular viewing cell the reflectance is about four or five percent. This is enough to create a very low intensity halo effect tending to enlarge the radiant spot. It is an extremely small fraction of the halo light eliminated by the filter, but the very process of elimination of the majority makes the remainder much more important. The interference coating works the same way on the exiting rays as on the entering rays and consequently the remaining very small quantity of halo light is further reduced by 75 to 80 percent.

Various other advantages and features of novelty will become apparent as the description proceeds in conjunction with the attached drawings, in which:

FIGURE 1 is a fragmentary schematic vertical sectional view, taken substantially along line 1—1 of FIGURE 4, of a cathode ray tube embodying one form of my invention;

FIGURE 2 is a similar view illustrating a modified form of the invention;

FIGURE 3 is a fragmentary perspective view of one form of the filter of this invention showing the relative positions of the filter elements and the phosphor dots;

FIGURES 4, 5, 6, 7 and 8 are fragmentary schematic front elevational views of varying grid forms of filter elements used in the invention;

Figure 9:
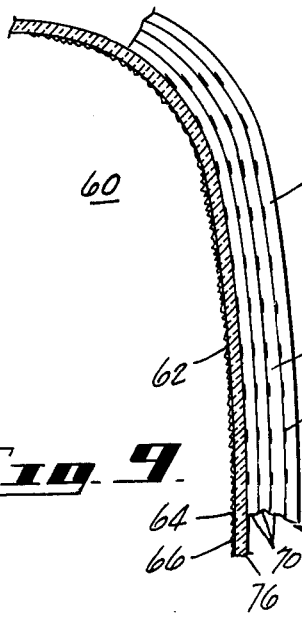
FIGURE 9 is a fragmentary vertical sectional view of a cathode ray tube embodying another form of the invention.

Referring now to the drawings in detail, FIGURE 1 illustrates a portion of a typical cathode ray tube 10, having a glass forward wall 12 to the exterior of which are secured a layer of transparent plastic material 14 and a layer of transparent glass 16 by an optically suitable cement to make up a typical safety glass panel.

Filter body 18 is made up of plurality of layers 20 of suitable transparent plastic material, such as polystyrene or polycarbonate, bearing a plurality of filter elements in grid form, each of which constitutes a tier of alternating light absorbing areas 22 and transparent areas 24. The light absorbing areas my be formed photographically or by printing with printer's ink or in any other suitable way which will produce the dimensions and characteristics outlined later in more detail. Although the layers are shown as separate for facility in understanding, they are actually secured together with an optical cement or in other known ways to produce a single substantially integral transparent body having no internal reflecting surfaces. In an alternative form the layers may be made of glass and fused together.

As shown, the panel or filter body 18 is substantially flat and extends across substantially the entire expanse of the tube at the greatest dimension of the latter, although this location is not essential. It is mounted in a simple peripheral channel frame 26 which is secured in the tube as shown. A small aperture 28 is provided to facilitate evacuation of the portion of the tube forward of the filter body.

Color phosphor dots 30 are imprinted on the rear face 32 of the filter body. They are shown distinct from each other for clarity but are usually substantially in contact with each other to produce a maximum signal. As seen in FIGURES 3 and 4, the dots are arranged in horizontal lines with the dots of different color characteristics repeatedly following each other in sequence, as indicated by the color designations. In each succeeding row the phase is shifted a half space so they nest more closely together and form triangular groups of three color dots as shown. The usual mask 34 is provided a suitable distance behind the phosphor screen and is pierced with apertures 36 for passage of the rays 38 from the electron guns, not shown.

It will now be seen that at least a plurality of filter elements of grid form are located between the phosphor screen and the forward face 40 of the filter body 18. Since there are no internal reflecting surfaces except the inner surface of face 40 the filter elements will trap substantially all of the unwanted off-axis rays before they reach the first internal reflecting surface, thus reducing the back glow or halo to a negligible value.

The light absorbing areas 22 of each filter element are shown in FIGURES 3 and 4 as slightly wavy but generally straight lines which extend horizontally along the borders between adjoining rows of dots. In all cases they overlie the lower edges of the upper row of dots and the upper edges of the lower row and block off only a small part of the area of each dot. All of the dimensions in the drawings are greatly exaggerated to clearly illustrate the construction. The phosphor dots in present day color tubes are approximately .013 inch in diameter. The grid lines 22, which are approximately in scale, are of the order of .003 inch wide and .0001 to .001 inch thick and the depthwise spacing between lines as presently used is about .010 inch or less. These dimensions, which are preently preferred, are very satisfactory but may be modified within reasonable limits. The lines as illustrated reduce the total signal by about twenty-five percent but the image contrast is so greatly increased that the actual image appears to be several times brighter and sharper. Since the lines run only horizontally there is no reduction of the horizintal angle of vision. It will be noted that the lines overlie the same area of every dot so there is no difference in proportion and therefore no adverse effect on the color composition.

The light trapping effect can be substantially increased by adding pointed peaks to the crests of the arcs in line 22, resulting in the form shown in FIGURE 5 where the undulant line 42 is provided with peaks 44 which approach each other between the individual dots. This gives an effect of greater separation without reducing the horizontal angle of vision and blocks off very little additional signal because most of the area of a peak covers the space between a group of dots.

Figure 6:
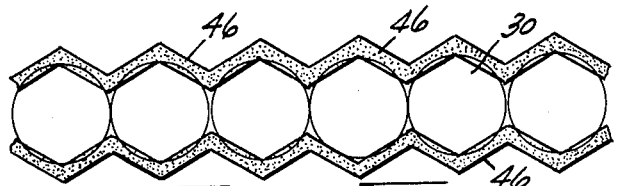
Figure 7:
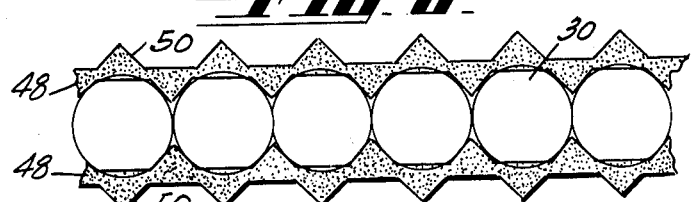

FIGURE 6 illustrates a configuration presenting peaks similar to FIGURE 5 but made up entirely of straight line sections 46. In FIGURE 7 a similar result is obtained with straight lines 48 provided with peaks 50 alternately projecting from opposite sides of the lines.

Figure 8:
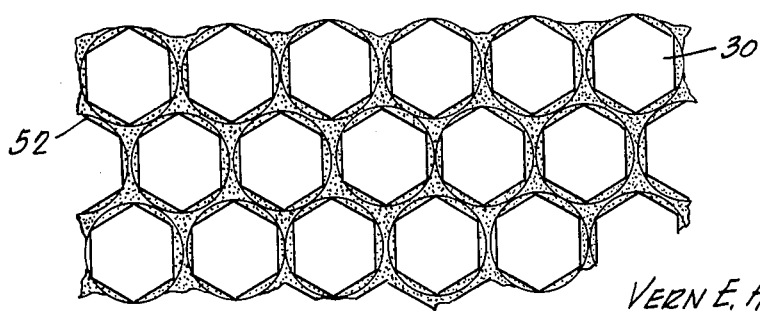

In the limited case where only one or two viewers must see the image, the construction illustrated in FIGURE 8 may be used. Here each dot is individually surrounded by a substantially complete hexagonal pattern 52 which will obviously trap side light as well as vertically displaced light. The angle of vision is still adequate to allow the viewer to change position within reasonable limits.

Obviously other closed figures would also be suitable.

The grid patterns of all of the layers in the light trapping lattice are in predetermined registry to provide a multiplicity of depthwise directed viewing cells. Normally the axes of the cells are substantially parallel to the axis of the tube. However, in special situations such as might occur in military or laboratory use, the viewer may have to be located a considerable lateral distance from the axis of the tube. In this event the grids are so registered in the course of manufacture that the axes of the cells are directed at the desired angle to afford full vision.

While the construction and arrangement of FIGURE 1 produce highly satisfactory results, the glass-to-air and air-to-glass surfaces inside the tube detract to some extent from the maximum effectivenes. These surfaces are eliminated in the modification of FIGURE 2 in which tube 10 contains a filter 54 which is the same in all practical respects as the filter of FIGURE 1. In this modification the filter is curved to conform to the inner face of the tube wall 12 and is secured thereto with optical cement or other suitable material of the proper index of refraction so that the internal reflecting surface between them is eliminated. Layers 14 and 16 are, of course, similarly secured so that the first internal reflecting surface will be the inner surface of face 56 of wall 16. Since the light trapping lattice is between the phosphor screen and the reflecting surface, back glow or halo is substantially eliminated as previously described. In the case where the filter body is made of glass it can be fused to the inner face of wall 12. The light trapping lattice acts in the same way as in FIGURE 1 to intercept ambient light rays directed toward the phosphor screen, and all of the same grid patterns are usable with this modification.

The light trapping lattice can be applied externally to ordinary "black and white" cathode ray tubes in such manner as to eliminate the halo problem as well as trap ambient light rays. Two useful arrangements are shown in FIGURES 9 and 10.

A conventional cathode ray tube 60 in FIGURE 9 is provided with the usual phosphor coating 62 on the inner face 64 of its forward wall 66. A filter 68 is provided which is made in the same manner as filters 18 and 54, including layers 70 provided with filter elements of grid form having light absorbing areas 72 and transparent areas 74. The filter is curved to conform to the outer face 76 of the tube wall and is secured thereto in the same manner as in the previous embodiment to eliminate internal reflecting surfaces. The glass shield 78 is not essential to the invention but is desirable to prevent damage to the exposed surface of the filter and also to complete the safety glass sandwich panel. When used it is so attached as to eliminate internal reflecting surfaces.

The filter traps ambient light rays in the manner previously described. Since internal reflecting surfaces have been eliminated between the inner face of wall 66 and the outer face of shield 78 it will be seen that the light trapping lattice is located between the phosphor screen and the first reflecting surface. Therefore it will trap unwanted off-axis rays emanating from the screen before they reach a reflecting surface and thus reduce back glow or halo to a negligible value even though the lattice is not immediately adjacent to the screen. As explained in detail above, the reduction of halo to a negligible value greatly increases the contrast and permits increase in brightnes of as much as 100 percent, thus for the first time making it possible to view a television picture outdoors in broad daylight and even in the presence of strong sunlight. Since the filter also performs the function of the gray glass, in a far high order of magnitude, it is possible to substitute clear glass (or eliminate the separate safety glass) and increase the percentage of transmission. All of these advantages accrue in all forms of the invention.

Figure 10:
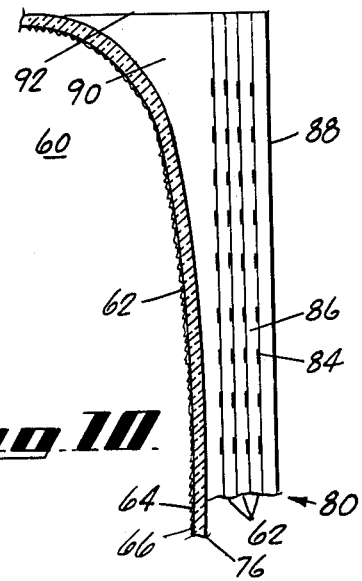
FIGURE 10 is a similar view illustrating still another form of the invention.

Similar results are obtained along with additional advantages in the modification of FIGURE 10. Here, tube 60 is provided with a flat filter 80 including layers 82 and filter elements of grid form having light absorbing areas 84 and transparent areas 86. A safety shield 88 is secured to the exposed face of the filter in such manner as to eliminate internal reflecting surfaces. An air gap between wall 66 and filter 80 would provide two reflecting surfaces to cause back glow or halo. This is avoided by completely filling the gap with a body of transparent material 90, preferably a plastic for lightness, and having substantially the same index of refraction as the tube wall and the filter. Body 90 is secured to the tube wall and to the filter with optical cement or the equivalent so that there will be no internal reflecting surfaces between the phosphor screen and the forward face of shield 88. It will be seen therefore that the light trapping lattice will function in the same way as in the embodiment of FIGURE 9. To prevent ambient rays from entering behind the filter and strikinbg the screen an opaque peripheral shield 92 is provided around the assembly. This may be a separate sleeve or a coating of paint or the like.

The flat filter is easier to make and is therefore more economical. Another advantage is that the tube can be tilted a slight amount and practically all specular light reflected off the first surface of the shield will be directed away from the eyes of the viewer. If it is desired to keep the tube axis exactly horizontal the filter and shield can be mounted with a desired angle of tilt by appropriate shaping of body 90.

Figure 11:
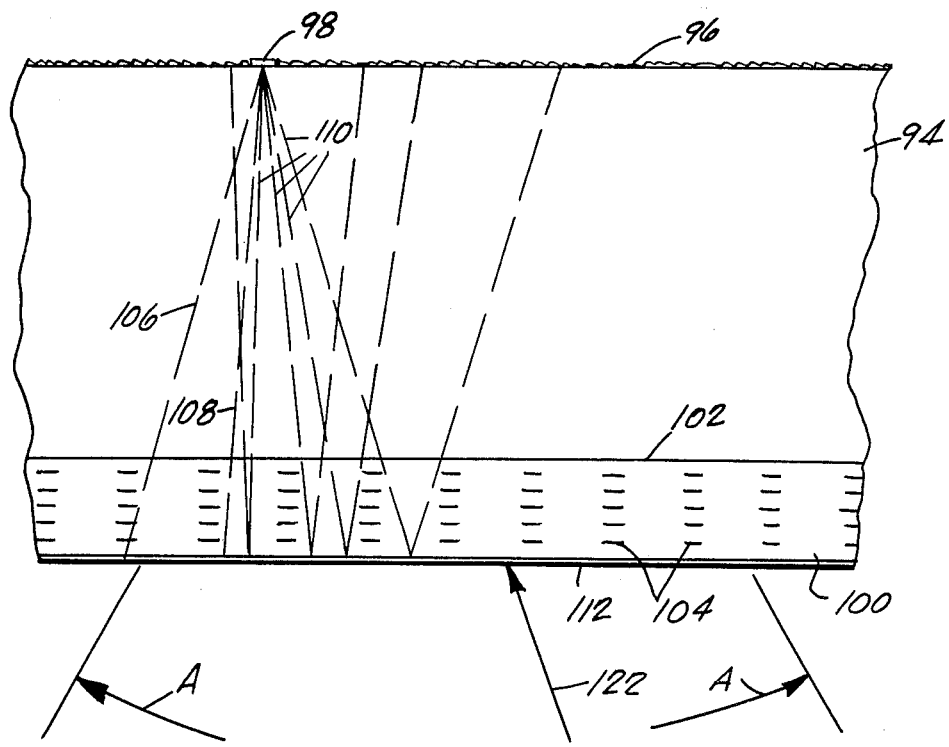
FIGURE 11 is a fragmentary horizontal sectional view of a cathode ray tube similar to the tube of FIGURE 9, with the addition of an anti-reflection interference coating.
Figure 12:
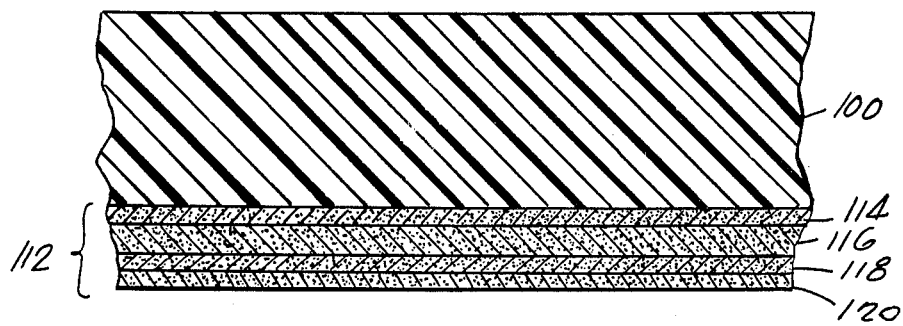
FIGURE 12 is a fragmentary horizontal sectional view of a piece of transparent material bearing a multi-layer interference coating.

The quality of the picture is further improved and a source of distraction and annoyance is greatly reduced by the incorporation of an anti-reflection interference coating on the first surface of the combined tube wall and filter as illustrated in FIGURES 11 and 12. While the filter is shown as secured on the exterior of the tube as in FIGURE 9, it is to be understood that this new combination functions in the same way when the filter is on the inside. The dimensions of the elements are greatly exaggerated for ease of illustration and explanation.

In the schematic showing of FIGURE 11, a very small portion of a cathode ray tube front wall is indicated by numeral 94. A phosphor layer 96 is secured to its inner surface and a single activated phosphor spot is shown at 98. Filter 100 is secured to the front face of the tube with transparent cement 102 having an index of refraction substantially the same as that of the tube and filter so that there is actually no internal reflecting surface at 102. Filter grid lines 104 are similar to grid lines 72 of filter 68 in FIGURE 9. It will be seen that light rays radiate from spot 98 in all directions in a cone. Off-axis rays such as 106 are trapped directly by the grid lines. Ray 108 passes through the viewing cell but its reflection is trapped by the grid lines. Rays 110 pass through various viewing cells and their reflections return to strike and illuminate the phosphor layer. Rays outside the cone indicated will strike and be trapped by various other grid lines 104.

The reflections of rays 110 produce some halo light but it is an extremely small fraction of the total which would be produced in the absence of the filter for two reasons. First, they are an extremely small proportion of the total quantity of reflections from all of the rays in a cone which would strike the front wall of the transparent body in the absence of the filter. Second, the reflectance at all possible angles of incidence of the untrapped rays is a minimum, four to five percent. However, because of the fact that the filter improves the picture to such a great extent, this one remaining bit of halo light now assumes considerable importance where in prior art constructions it was negligible.

This problem is met by the application of an anti-reflection interference coating 112 on the first surface of the combined filter and tube wall, which may be considered the viewing screen. The coating cooperates directly with the filter by acting on all of the rays which are not trapped by the latter. The reflectance of the first surface of the viewing screen is reduced to a value of one percent or less and hence the remaining halo effect is reduced by 75 to 80 percent.

A highly suitable combination for this purpose is illustrated in FIGURE 12. The filter body 100 is composed of polycarbonate resin, and to it are applied, in the order shown, layers 114, 116 and 118 of silicon monoxide and layer 120 of magnesium fluoride. Layers 114, 118, and 120 have an optical thickness of $\frac{1}{4}\lambda$ and layer 116 has an optical thickness of $\frac{1}{2}\lambda$, all at about 5500 A. This combination results in a reflectance of about 0.8 percent at 5500 A., and this approximate value is maintained through a major portion of the visible spectrum. The coating adheres very well and has good abrasion resistance. The materials, the combination, and the manner of applying the coating are disclosed in detail in the copending application of B. A. Libbert, Serial No. 343,637, filed February 10, 1964.

Coating 112 has the same functional effect on ambient rays such as 122 directed toward the first surface of the viewing screen within the normal viewing angle indicated by arrows A—A. The reflectance of the uncoated surface to rays at incidences within the indicated viewing angle is about four to five percent. As noted above, because of the extremely dark background produced by the filter, the eye becomes sensitive to low level illumination, and the specular reflection from these nearly normal rays becomes quite noticeable and annoying. When coating 112 is applied, the total specular reflection is reduced by 75 to 80 percent and the remainder is negligible.

Because of the nature of interference coatings they become less effective for their intended purpose as the incident rays diverge more and more from the normal. Beyond 30 to 40 degrees their reflectance increases appreciably, and specular reflection could again be a problem to the viewer. However these angles represent approximately the useful viewing angles built into the filter (60 to 80 degrees included angle in the horizontal plane) and thus the viewer automatically restricts himself to positions in which he will not be bothered by the increased reflectance. Hence it will be seen that the total effect of the combination of the tube wall, filter, and coating eliminates off-axis ambient light rays directed toward the screen and reduces the halo effect and specular reflections to a minimum.

It will be apparent that various changes and modifications may be made in the constructions disclosed herein without departing from the spirit of the invention and it is intended that all such changes and modifications shall be embraced within the scope of the following claims.

I claim:

1. Means for improving the image presented by a cathode ray tube adapted for color television, comprising: a filter body of transparent material having a forward face and a rear face; said filter body bearing a plurality of filter elements of grid form; each element constituting a generally planar tier of alternating light absorbing and transparent areas, and said tiers being in generally parallel depthwise spaced relation; the corresponding areas of the grid pattern in each tier being in predetermined registry to produce a multiplicity of depthwise directed viewing cells; and multiplicity of phosphor dots secured to the rear face of said filter body and arranged in in a geometrical pattern; said dots having varied characteristics to produce a multi-colored image in operation; the light absorbing areas of each of said filter elements comprising lines registered with at least portions of the outlines of said dots; siad filter body being so formed as to be substantially free of internal reflecting surfaces between its forward and rear faces.

2. In a cathode ray tube adapted for color television, having an envelope including a transparent forward wall, means for improving the image presented thereby, comprising: a thin, generally planar filter body spaced rearwardly from said wall and extending laterally across substantially the entire expanse of the envelope; said filter body being formed of transparent material and bearing a plurality of filter elements of grid form; each element constituting a generally planar tier of alternating light absorbing and transparent areas, and said tiers being in generally parallel depthwise spaced relation; the corresponding areas of the grid pattern in each tier being in predetermined registry to produce a multiplicity of depthwise directed viewing cells; and a multiplicity of phosphor dots secured to the rear face of said filter body and arranged in a geometrical pattern; said dots having varied characteristics to produce multi-color image in operation; the light absorbing areas of each of said filter elements comprising lines registered with at least portions of the outlines of said dots.

3. A construction as claimed in claim 2 in which said dots are arranged in generally straight and generally parallel rows; and the light absorbing areas of each of said filter elements comprise generally straight and generally parallel lines having the same pitch as the lines of dots; said light absorbing lines being so located with respect to said dots as to lie generally between adjacent lines of dots.

4. A construction as claimed in claim 3 in which the margins of said light absorbing lines are diverted to follow portions of the outlines of said dots.

5. A construction as claimed in claim 2 in which the light absorbing areas of each of said filter elements comprise substantially closed figures arranged in the same geometrical pattern as said dots and so located with respect to said dots as to define virtually individual depthwise directed viewing cells for each of said dots.

6. In a cathode ray tube adapted for television, having an envelope including a transparent forward wall, means for improving the image presented thereby, comprising; a thin, generally planar filter body mounted directly on the inner face of said forward wall; said filter body being formed of transparent material and bearing a plurality of filter elements of grid form; each element constituting a generally planar tier of alternating light absorbing and transparent areas, and said tiers being in generally parallel spaced relation; the corresponding areas of the grid pattern in each tier being in predetermined registry to produce a multiplicity of depthwise directed viewing cells; and a multiplicity of phosphor dots secured to the rear face of said filter body and arranged in a geometrical pattern; said dots having varied characteristics to produce a multi-colored image in operation; the light absorbing areas of each of said filter elements comprising lines registered with at least portions of the outlines of said dots; said filter body being so secured to said wall as to eliminate internal reflecting surfaces between the rear face of said filter body and the forward face of said wall.

7. A construction as claimed in claim 6 in which said dots are arranged in generally straight and generally parallel rows; and the light absorbing areas of each of said filter elements comprise generally straight and generally parallel lines having the same pitch as the lines of dots; said light absorbing lines being so located with respect to said dots as to lie generally between adjacent lines of dots.

8. A construction as claimed in claim 7 in which the margins of said light absorbing lines are diverted to follow portions of the outlines of said dots.

9. A construction as claimed in claim 6 in which the light absorbing areas of each of said filter elements comprise substantially closed figures arranged in the same geometrical pattern as said dots and so located with respect to said dots as to define virtually individual depthwise directed viewing cells for each of said dots.

10. In a cathode ray tube having an envelope including a transparent forward wall, means for improving the image presented thereby, comprising: a thin, generally planar filter body mounted directly on the inner face of said forward wall; said filter body being formed of transparent material and bearing a plurality of filter elements of grid form; each element constituting a generally planar tier of alternating light absorbing and transparent areas, and said tiers being a generally parallel spaced relation; the corresponding areas of the grid pattern in each tier being in predetermined registry to produce a multiplicity of depthwise directed viewing cells; and a phosphor layer mounted on the rear face of the filter body; said filter body being so secured to said wall as to eliminate internal reflecting surfaces between the rear face of said filter body and the forward face of said wall.

11. Means for improving the image presented by a cathode ray tube, comprising: a body of transparent material having a forward face and a rear face; a light trapping lattice borne by said body and including a plurality of filter elements of grid form between said forward and rear faces; each element constituting a generally planar tier of alternating light absorbing and transparent areas, and said tiers being in generally parallel depthwise spaced relation in said body; the corresponding areas of the grid pattern in each tier being in predetermined registry to produce a multiplicity of depthwise directed viewing cells; said body being so formed as to be substantially free of internal reflecting surfaces between said faces; and a phosphor layer carried by the rear face of said body; the filter elements of said lattice serving the dual purpose of intercepting ambient light rays directed angularly toward said body from external sources and intercepting light rays emanating from said phosphor layer and directed angularly toward the internal reflecting surface of said forward face.

12. A construction as claimed in claim 11 in which said phosphor layer comprises a multiplicity of phosphor dots secured to said rear face and arranged in generally straight and generally parallel rows; and the light absorbing areas of each of said filter elements comprise generally straight and generally parallel lines having the same pitch as the lines of phosphor dots; said light absorbing lines being so located with respect to said phosphor dots as to lie generally between adjacent lines of dots.

13. A construction as claimed in claim 12 in which the margins of said light absorbing lines are diverted to follow portions of the outlines of said dots.

14. A construction as claimed in claim 11 in which said phosphor layer comprises a multiplicity of phosphor dots secured to said rear face and arranged in a geometrical pattern; and the light absorbing areas of each of said filter elements comprise substantially closed figures arranged in the same geometrical pattern and so located with respect to said dots as to define virtually individual depthwise directed viewing cells for each of said dots.

15. A construction as claimed in claim 11 in which the rearmost filter element is located substantially at the rear face of said body adjacent said phosphor layer and additional filter elements are spaced forwardly therefrom throughout at least a portion of the depth of said body.

16. Means for improving the image presented by a cathode ray tube having an envelope including a transparent forward wall with inner and outer faces and a phosphor layer secured to the inner face, comprising: a body of transparent material having a forward face and a rear face; a light trapping lattice borne by said body and including a plurality of filter elements of grid form between said forward and rear faces; each element constituting a generally planar tier of alternating light absorbing and transparent areas, and said tiers being in generally parallel depthwise spaced relation in said body; the corresponding areas of the grid pattern in each tier being in predetermined registry to produce a multiplicity of depthwise directed viewing cells; said filter body being so formed and its rear face being so secured to the outer face of the tube wall as to substantially eliminate internal reflecting surfaces between the inner face of the tube wall and the forward face of the filter body.

17. Means for improving the image presented by a cathode ray tube having an envelope including a transparent, outwardly convex forward wall with inner and outer faces and a phosphor layer secured to the inner face, comprising: a thin, planar, filter body of transparent material having substantially flat forward and rear faces; a light trapping lattice borne by said body and including a plurality of filter elements of grid form; each element constituting a generally planar tier of alternating light absorbing and transparent areas, and said tiers being in generally parallel depthwise spaced relation; the corresponding areas of the grid pattern in each tier being in predetermined registry to produce a multiplicity of depethwise directed viewing cells; said filter body being spaced forward of the outer face of said tube; and a body of transparent material having a forward face conforming to the rear face of the filter body and a rear face conforming to the outer face of the tube and arranged to fill the gap between the tube face and the filter body; said filter body, gap-filling body, and outer tube face being so secured to each other as to substantially eliminate internal reflecting surfaces between the rear face of the tube wall and the forward face of the filter body.

18. Means for improving the image presented by a cathode ray tube having an envelope including a transparent, outwardly convex forward wall with inner and outer faces and a phosphor layer secured to the inner face, comprising: a thin, uniform thickness, filter body of transparent material having forward and rear faces and having a concavo-convex form corresponding to the outer face of said forward wall; a light trapping lattice borne by said body and including a plurality of filter elements of grid form between said forward and rear faces; each element constituting a tier of alternating light absorbing and transparent areas substantially parallel to the faces of said filter body, and said tiers being in generally parallel depthwise spaced relation in said body; the corresponding areas of the grid pattern in each tier being in predetermined registry to produce a multiplicity of depthwise directed viewing cells; said filter body being cemented directly to the outer face of said forward wall with a transparent cement having substantially the same index of refraction as said forward wall and said filter body, whereby internal reflecting surfaces between the inner face of the tube wall and the forward face of the filter body are substantially eliminated; the light absorbing areas of said filter elements trapping the off-axis ambient light rays directed toward said phosphor screen and also the off-axis light rays emanating from said phosphor screen to substantially eliminate halo effect.

19. Means for increasing the apparent brightness and the actual brightness of a cathode ray tube having an envelope including a transparent forward wall with inner and outer faces and a phosphor layer secured to the inner face, comprising: a body of transparent material having a forward face and a rear face; a light trapping lattice borne by said body and including a plurality of filter elements of grid form between said forward and rear faces; each element constituting a generally planar tier of alternating light absorbing and transparent areas, and said tiers being in generally parallel depthwise spaced relation in said body; the corresponding areas of the grid pattern in each tier being in predetermined registry to produce a multiplicity of depthwise directed viewing cells; said filter body being so formed and its rear face being so secured to the outer face of the tube wall as to substantially eliminate internal reflecting surfaces between the inner face of the tube wall and the forward face of the filter body; the black-body character of said filter body producing a dark background and thus increasing the contrast with the image signals and increasing their apparent brightness; said filter body trapping off-axis ambient light rays directed inwardly toward said phosphor layer and eliminating their reflections therefrom to further darken the background; and said filter body further trapping off-axis light rays emitted by activated phosphors and preventing their back reflection onto the phosphor layer and substantially eliminating halo effect, and thus eliminating the need for a darkened tube wall and eliminating the limitation on the intensity of the image signals; said tube wall being formed of clear glass; and means to raise the intensity of said image signals to a value well above the maximum useable intensity in a conventional cathode ray tube.

20. Means for improving the image presented by a cathode ray tube having an envelope including a transparent forward wall with inner and outer faces and a phosphor layer secured to the inner face, comprising: a body of transparent material having a forward face and a rear face; a light trapping lattice borne by said body and including a plurality of filter elements of grid form between said forward and rear faces; each element constituting a generally planar tier of alternating light absorbing and transparent areas, and said tiers being in generally parallel depthwise spaced relation in said body; the corresponding areas of the grid pattern in each tier being in predetermined registry to produce a multiplicity of depthwise directed viewing cells; said filter body being so formed and its rear face being so secured to the outer face of the tube wall as to substantially eliminate internal reflecting surfaces between the inner face of the tube wall and the forward face of the filter body; said filter elements trapping substantially all of the rays emitted by the image signals from the phosphor layer which are so angularly disposed that they cannot pass through the viewing cells, thus eliminating substantially all of the halo effect on the phosphor layer which would be produced in the absence of said filter body; the nearly normal rays which pass through the viewing cells having a low percentage of reflection which produces a slight halo effect; and an anti-reflection interference coating on the forward face of the filter body which reduces the percentage of reflection of the nearly normal rays to such an extent that the remaining halo effect is negligible.

21. A construction as claimed in claim 20; said coating being a multi-layer coating which reduces the percentage of reflection of the nearly normal rays to a value of the order of one percent.

22. The combination of a cathode ray tube, a space lattice type filter, and an anti-reflection interference coating; said tube having an envelope including a transparent forward wall with inner and outer faces and a phosphor layer secured to the inner face; said filter comprising a body of transparent material having a forward face and a rear face; a light trapping lattice borne by said body and including a plurality of filter elements of grid form between said faces; each element constituting a generally planar tier of alternating light absorbing and transparent areas and said tiers being in generally parallel depthwise spaced relation in said body; the corresponding areas of the grid pattern in each tier being in predetermined registry to produce a multiplicity of depthwise directed viewing cells; the depth and width of said viewing cells being chosen to provide a predetermined horizontal and vertical extent of maximum useful included viewing angle tending to restrain a viewer to a position within said angles; said filter body being located in front of and in proximity to the forward wall of said tube; said interference coating being mounted directly on the forward face of said filter body and acting to substantially reduce the reflectance thereof; its effectiveness with respect to selected wave lengths of light diminishing with departure of the rays of said light from a normal to the surface but remaining close to the maximum within the predetermined viewing angles, whereby it reduces the intensity of specular reflections of ambient light which reach the eye of a viewer to a negligible value.

23. A construction as claimed in claim 22; the maximum horizontal useful included viewing angle being of the order of 60 to 80 degrees.

24. A construction as claimed in claim 22; said coating being a multi-layer coating which reduces the percentage of reflection of nearly normal rays to a value of the order of one percent.

No references cited.

ROBERT SEGAL, *Acting Primary Examiner.*